US006939916B2

(12) United States Patent
Merritt et al.

(10) Patent No.: US 6,939,916 B2
(45) Date of Patent: Sep. 6, 2005

(54) ADHESION PROMOTER, COATING COMPOSITIONS FOR ADHESION TO OLEFINIC SUBSTRATES AND METHODS THEREFOR

(75) Inventors: William H. Merritt, Ferndale, MI (US); Craig S. Schang, Brighton, MI (US)

(73) Assignee: BASF Corporation, Southfield, MI (US)

( * ) Notice: Subject to any disclaimer, the term of this patent is extended or adjusted under 35 U.S.C. 154(b) by 250 days.

(21) Appl. No.: 10/420,046

(22) Filed: Apr. 21, 2003

(65) Prior Publication Data

US 2003/0229179 A1 Dec. 11, 2003

Related U.S. Application Data

(63) Continuation of application No. 09/707,513, filed on Nov. 7, 2000, now abandoned.

(51) Int. Cl.[7] .......................... B32B 25/08; B05D 3/02; C08L 23/28; C08L 53/00; C08L 33/14

(52) U.S. Cl. ...................... 525/91; 427/393.5; 428/483; 524/505; 525/90; 525/92 C; 525/92 F; 525/92 H; 525/92 K

(58) Field of Search ................................ 525/92 K, 90, 525/91, 92 C, 92 F, 92 H, 505; 427/393.5; 428/483

(56) References Cited

U.S. PATENT DOCUMENTS

| | | | | | |
|---|---|---|---|---|---|
| RE27,145 | E | * | 6/1971 | Jones | 525/272 |
| 3,666,701 | A | * | 5/1972 | Marrs | 524/272 |
| 4,039,593 | A | * | 8/1977 | Kamienski et al. | 568/857 |
| 4,683,264 | A | * | 7/1987 | Urata et al. | 525/65 |
| 4,717,711 | A | * | 1/1988 | Vanier et al. | 503/227 |
| 4,874,818 | A | * | 10/1989 | Yamamoto et al. | 525/183 |
| 4,898,965 | A | * | 2/1990 | Kinoshita et al. | 558/416 |
| 4,997,882 | A | * | 3/1991 | Martz et al. | 525/65 |
| 5,102,944 | A | * | 4/1992 | Ohmika et al. | 524/501 |
| 5,106,446 | A | * | 4/1992 | Beck et al. | 156/331.7 |
| 5,319,032 | A | * | 6/1994 | Martz et al. | 525/301 |
| 5,376,745 | A | * | 12/1994 | Handlin et al. | 526/178 |
| 5,397,602 | A | * | 3/1995 | Martz et al. | 427/393.5 |
| 5,458,933 | A | * | 10/1995 | Suskind | 428/34.2 |
| 5,486,570 | A | * | 1/1996 | St. Clair | 525/123 |
| 5,488,455 | A | * | 1/1996 | Cahill et al. | 399/2 |
| 5,500,163 | A | * | 3/1996 | Ponnet | 264/473 |
| 5,512,333 | A | * | 4/1996 | Suskind | 427/536 |
| 5,536,544 | A | * | 7/1996 | Liegeois | 428/36.1 |
| 5,597,864 | A | * | 1/1997 | Leiss | 525/64 |
| 5,667,856 | A | * | 9/1997 | Kamen et al. | 428/34.6 |
| 5,830,578 | A | * | 11/1998 | Ono et al. | 428/446 |
| 5,853,898 | A | * | 12/1998 | Obara et al. | 428/32.81 |
| 5,863,646 | A | * | 1/1999 | Verardi et al. | 428/323 |
| 6,300,414 | B1 | * | 10/2001 | McGee et al. | 525/165 |
| 6,423,778 | B1 | * | 7/2002 | McGee et al. | 525/165 |

FOREIGN PATENT DOCUMENTS

| | | | | | |
|---|---|---|---|---|---|
| DE | 4211412 | A1 | * | 10/1993 | C08L/25/08 |
| EP | 267053 | A | * | 5/1988 | C07C/69/80 |
| EP | 698638 | A1 | * | 2/1996 | C08L/19/00 |
| EP | 982353 | A1 | * | 3/2000 | C08J/7/04 |
| EP | 982337 | B1 | * | 3/2004 | C08F/293/00 |
| GB | 2125803 | A | * | 3/1984 | C08L/67/04 |
| JP | 62232493 | A | * | 10/1987 | C10L/1/32 |
| JP | 03036829 | A | * | 2/1991 | H04J/11/00 |
| JP | 03060113 | A | * | 3/1991 | H01L/21/027 |
| JP | 04025454 | A | * | 1/1992 | B32B/27/30 |
| JP | 04038777 | A | * | 2/1992 | G11B/21/10 |
| JP | 07223297 | A | * | 8/1995 | B32B/27/28 |
| JP | 08081616 | A | * | 3/1996 | C08L/63/00 |
| JP | 08207569 | A | * | 8/1996 | B60J/3/04 |
| JP | 2627839 | B2 | * | 7/1997 | C08G/18/10 |
| WO | WO 9416027 | A1 | * | 7/1994 | C09J/201/00 |
| WO | WO 9735936 | A1 | * | 10/1997 | C09D/119/00 |
| WO | WO 9735937 | A1 | * | 10/1997 | C09D/119/00 |
| WO | WO 9803334 | A1 | * | 1/1998 | B32B/27/36 |
| WO | WO 9815601 | A1 | * | 4/1998 | C09J/5/00 |

OTHER PUBLICATIONS

St. Clair, "Coating Resins Based on Melamine Cured Polyolefin Diol," technical bulletin, Shell Chemical Company, TPO's in Automotive Conference, 1996.*

McNeal, "Low Viscosity Functionalized Liquid Polymers—A New Approach for Adhesion to Non–Polar Substrates," technica bulletin, Shell Chemical Company, TPO's in Automotive Conference, 1996.*

* cited by examiner

*Primary Examiner*—Robert Sellers

(57) ABSTRACT

The composition is an adhesion promoter that includes a chlorinated polyolefin and an olefin-based block copolymer that has an olefin block that is substantially saturated and at least one (poly)ester or (poly)ether block. The olefin-based block copolymer can be prepared by reacting an hydroxyl-functional, saturated or substantially saturated olefin polymer with a chain-extension reagent that is reactive with hydroxyl groups and will polymerize in a head-to-tail arrangement of monomer units. The composition provides excellent adhesion to olefinic substrates like TPO. A method of making the adhesion promoter composition includes forming the olefin-based block copolymer, providing the copolymer at temperatures between 85° C. and 50° C. and adding, with agitation, chlorinated polyolefin to the copolymer at these temperatures. A coating is formed by combining the adhesion promoter with desired film-forming polymers, crosslinkers and coating additives.

26 Claims, 1 Drawing Sheet

Comparative testing of adhesion promoter technologies

QCT humidity testing**

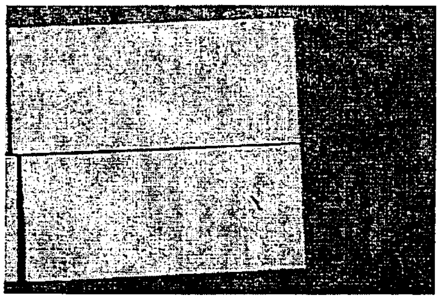

Figure 1

Invention: 7.5% Polytail H with E-caprolactone /CPO hot-blended.

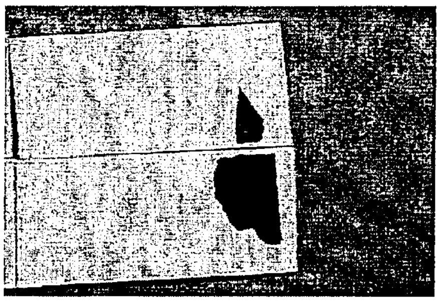

Figure 2

Comparative A: 5% Polytail H with E-caprolactone + 2.5% CPO, not hot-blended.

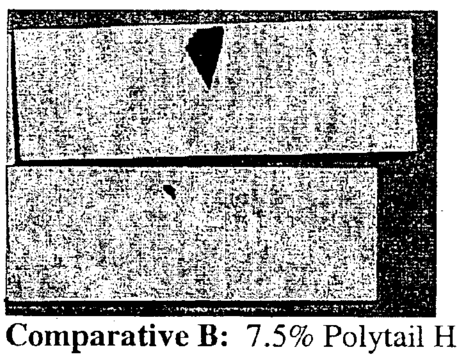

Figure 3

Comparative B: 7.5% Polytail H with E-caprolactone, no CPO present

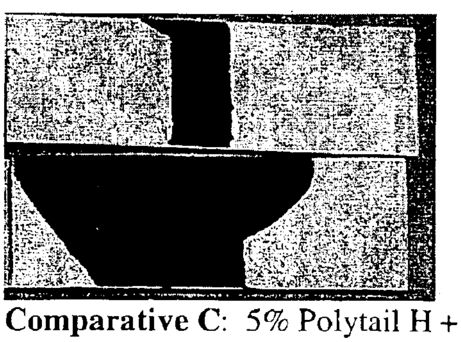

Figure 4

Comparative C: 5% Polytail H + 2.5% CPO, no E-caprolactone, not hot-blended.

**QCT humidity testing run using a Cleveland Condensing humidty cabinet, 100% humidity at 140°F for 72 hours. Adhesion is X-scribe per GM test method GM9071P method B (X-scribe, with tape pull)

ADHESION PROMOTER, COATING COMPOSITIONS FOR ADHESION TO OLEFINIC SUBSTRATES AND METHODS THEREFOR

CROSS REFERENCE TO RELATED APPLICATIONS

This application is a continuation in part of U.S. patent application Ser. No. 09/707,513, filed Nov. 7, 2000 abandoned.

FIELD OF THE INVENTION

This invention concerns adhesion promoters, curable coating compositions, especially compositions that are applied over olefinic substrates, particularly thermoplastic polyolefin (TPO) substrates and a method of making said coatings.

BACKGROUND OF THE INVENTION

Adhesion additives are known throughout the automotive coatings industry. As is understood by those skilled in the art, adhesion additives are used as components in primer surfacers, or other intermediate coating compositions, to promote adhesion between a substrate and a topcoat system for an automobile, such as a topcoat system including a flexible basecoat and flexible clearcoat. In general, plastic substrates may be coated with curable, or thermosettable, coating compositions. Color-plus-clear composite coatings have been particularly useful as topcoats for which exceptional gloss, depth of color, distinctness of image, or special metallic effects are desired. Adhesion additives are primarily used in primer surfacers, typically solventborne primer surfacers, that are applied to a bumper, i.e., facie, or other trim component as the substrate. Typically, these substrates are made up of thermoplastic polyolefin (TPO), and without the inclusion of an adhesion copolymer in an intermediate solventborne primer surfacer layer, the topcoat system may delaminate from the TPO substrate.

One example of an adhesion additive is chlorinated polyolefin. Other adhesion additives are olefin-based based copolymers that have an olefin block that is substantially saturated and at least one (poly)ester or (poly)ether block. The olefin-based block copolymer is typically present in an organic solvent such as xylene, toluene, and the like. The individual components of the adhesion copolymers, i.e., the olefin-based block copolymer, frequently settle out into the organic solvent. This settling renders the adhesion copolymer unstable, i.e., having poor shelf stability, and therefore, not suitable for use as a component of a solventborne primer. These are described in U.S. Pat. Nos. 6,300,414 and 4,898,965. These patents, however, do not include chlorinated polyolefin as an adhesion additive and do not teach the method of the present invention of hot blending chlorinated polyolefin and the olefin-based copolymers and coatings containing adhesion additives prepared thereby.

Adhesion promoters including chlorinated polyolefin and a diene that is not reacted with epsilon caprolactone are taught in U.S. Pat. No. 5,863,646. However these coatings demonstrate less effective adhesion than olefin-based copolymers combined with chlorinated polyolefin prepared according to the method of the present invention.

It would be desirable to provide a coating composition comprising a more stable adhesion promoter that provides improved physical properties, including improved adhesion under harsh testing conditions.

SUMMARY OF THE INVENTION based block copolymer and chlorinated polyolefin, a method for preparing the adhesion additive and a coating containing the adhesion additive are disclosed. The present invention provides a method for stabilizing an adhesion additive composition that includes at least two components, a chlorinated polyolefin and an olefin-based block copolymer that has an olefin block and at least one (poly)ester or (poly)ether block. By the terms "(poly)ester block" and "(poly)ether block" it is meant that the base polyolefin material is modified with one or more monomer units through formation of, respectively, ester or ether linkages. For purposes of the present invention, "(poly)ester block" has a special meaning that, in the case of two or more monomer units, the monomer units are predominantly, preferably exclusively, arranged in head-to-tail linkages. Thus, the arrangement of the ester linkages in the (poly)ester block or blocks may be represented by

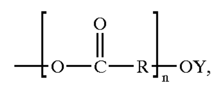

in which n represents the number of monomer units, R represents the part of each monomer unit between the ester groups (which may be all the same if only one type of monomer is used or different for individual units if a mixture of different monomers is used), and Y represents the end-group of the block. The monomer units should be arranged exclusively in the head-to-tail arrangement, although it is possible, particularly in longer blocks, for there to be some variation; in the latter case, the arrangement should still be predominantly head-to-tail. Preferred embodiments for n, R, and Y are described below.

The olefin-based block copolymer can be prepared by reacting an hydroxyl-functional, saturated or substantially saturated olefin polymer with a chain-extension reagent that is reactive with hydroxyl groups and will polymerize in a head-to-tail arrangement of monomer units. Such chain-extension reagents include, without limitation, lactones, hydroxy carboxylic acids, oxirane-functional materials such as alkylene oxides, and combinations of these. Preferred chain-extension reagents are lactones and alkylene oxides, and even more preferred are epsilon caprolactone, ethylene oxide, and propylene oxide.

The olefin-based block copolymer and chlorinated polyolefin are combined to form a stable adhesion promoter by providing the block copolymer at a temperature between 85° C. and 50° C. and adding a chlorinated polyolefin, with agitation to form a dispersion of the copolymer and chlorinated polyolefin.

Compositions including the chlorinated polyolefin and the olefin-based block copolymer can be used in a curable coating composition, especially a primer coating composition, to provide good adhesion to olefinic substrates like TPO, even at relatively low levels of the olefin-based block copolymer and chlorinated polyolefin. The coating composition of the invention can be applied directly to an unmodified plastic substrate, in other words to a plastic substrate that has no flame or corona pretreatment or any other treatment meant to chemically modify the surface of the substrate and to which no previous adhesion promoter or coating has been applied.

BRIEF DESCRIPTION OF THE PHOTOGRAPHS

Photograph 1 is a depiction of a TPO substrate coated with the coating of Example 1 following exposure to humidity testing.

Photograph 2 is a depiction of a TPO substrate coated with Comparative Coating A following exposure to humidity testing.

Photograph 3 is a depiction of a TPO substrate coated with Comparative coating B following exposure to humidity testing.

Photograph 4 is a depiction of a TPO substrate coated with Comparative coating C following exposure to humidity testing.

DETAILED DESCRIPTION OF THE INVENTION

The adhesion additive of the present invention comprises at least an olefin-based block copolymer and chlorinated polyolefin. The olefin-based block copolymer of the invention is prepared from saturated or substantially saturated polyolefin polyol preferably having a number average molecular weight of from about 1000 up to about 5000, more preferably from about 1000 up to about 3500, and even more preferably from about 1500 up to about 3500. This olefin block copolymer is disclosed in U.S. Pat. No. 6,300, 414. The adhesion additive is used in a coating to promote adhesion to a substrate, preferably a TPO substrate.

The method of the present invention stabilizes the adhesion additive and the coating composition containing the additive. More specifically, the method of the subject invention stabilizes a mixture of olefin-based block copolymer and chlorinated polyolefin. To adequately stabilize the olefin-based block copolymer and chlorinated polyolefin, the method includes the steps of providing the olefin based block copolymer at a temperature of between 85° C. and 50° C. and adding chlorinated polyolefin in a solid particulate form to melt the polyolefin. The olefin-based block copolymer can be added after it is synthesized and cooled to between 85° C. and 50° C. or can be formulated, cooled and reheated to this temperature range. Throughout the specification ranges are used as shorthand for describing every value within the range. Any value within the range can be selected as the terminus.

The olefin-based block copolymer used in the compositions of the invention has at least one block that is a (poly)ester or (poly)ether block and at least one block is an olefin material. Preferably, the block copolymer has one block of the olefin material to which is attached one or more of the (poly)ester and/or (poly)ether blocks. In one embodiment, the olefin-based block copolymer of the invention can be represented by a structure $$A\text{-}[O\text{-}(B)]_m,$$

in which A represents an olefin block, B represents a (poly)ester or (poly)ether block or combinations thereof, and m is on average from about 0.7 to about 10, preferably from about 1.7 to about 2.2, and particularly preferably about 1.9 to about 2. The A block is a saturated or substantially saturated olefin polymer. In a preferred embodiment, the A block is substantially linear. In general, about 15% or less of the carbons of the A block should be pendant to the olefin polymer backbone. Preferably 10% or less, more preferably 8% or less of the carbons of the A block should be pendant to the olefin polymer backbone.

Each B block preferably contains, on average, from about 0.5 to about 25 monomer units, more preferably on average from about 2 to about 10, and even more preferably on average from about 2 to about 6 monomer units per hydroxyl group of the unmodified olefin block. The monomer units may be the same or there may be different monomer units in a single (poly)ester or (poly)ether block. For example, a (poly)ether block may have one or more ethylene oxide units and one or more propylene oxide units.

The olefin-based block copolymer of the invention can be prepared by reacting a hydroxyl-functional olefin polymer with a chain-extension reagent that is reactive with hydroxyl groups and will polymerize in a head-to-tail arrangement of monomer units. The hydroxyl-functional olefin forms the A block, while the chain-extension reagent forms the B block or blocks. Such chain-extension reagents include, without limitation, lactones, hydroxy carboxylic acids, oxirane-functional materials such as alkylene oxides, and combinations of these. Preferred chain-extension reagents are lactones and alkylene oxides, and even more preferred are epsilon-caprolactone, ethylene oxide, propylene oxide, and combinations of these.

The hydroxyl-functional olefin polymer may be produced by hydrogenation of a polyhydroxylated polydiene polymer. Polyhydroxylated polydiene polymers may be produced by anionic polymerization of monomers such as isoprene or butadiene and capping the polymerization product with alkylene oxide and methanol, as described in U.S. Pat. Nos. 5,486,570, 5,376,745, 4,039,593, and Reissue 27,145, each of which is incorporated herein by reference. The polyhydroxylated polydiene polymer is substantially saturated by hydrogenation of the double bonds that is at least 90 percent, preferably at least 95% and even more preferably essentially 100% complete to form the hydroxyl-functional olefin polymer. The hydroxyl equivalent weight of the hydroxyl-functional saturated olefin polymer may be from about 500 to about 20,000.

The hydroxyl-functional olefin polymer is preferably a hydroxyl-functional hydrogenated copolymer of butadiene with ethylene, propylene, 1,2 butene, and combinations of these. The olefin polymers may have a number average molecular weight of preferably from about 1000 to about 10,000, more preferably from about 1000 to about 5000, even more preferably from about 1000 up to about 3500, and still more preferably from about 1500 up to about 3500. The olefin polymer also preferably has at least one hydroxyl group on average per molecule. Preferably, the olefin polymer has from about 0.7 to about 10 hydroxyl groups on average per molecule, more preferably from about 1.7 to about 2.2 hydroxyl groups on average per molecule, and still more preferably about 2 hydroxyl groups on average per molecule. The hydroxyl-functional olefin polymer preferably has terminal hydroxyl groups and a hydroxyl equivalent weight of from about 1000 to about 3000. Molecular weight polydispersities of less than about 1.2, particularly about 1.1 or less, are preferred for these materials.

The olefin polymer is preferably a low molecular weight poly(ethylene/butylene) polymer having at least one hydroxyl group. In another preferred embodiment the polyolefin polyol is a hydrogenated polybutadiene. In forming the hydrogenated polybutadiene polyol, part of the butadiene monomer may react head-to-tail and part may react by a 1,2 polymerization to yield a carbon-carbon backbone having pendent ethyl groups from the 1,2 polymerization. The relative amounts of head-to-tail and 1,4 and 1,2 polymerizations can vary widely, with from about 15% to about 20% of the monomer reacting by the 1,2 polymerizaton.

Such preferred hydrogenated polyolefin polyols are those available under the trademark POLYTAIL™ from Mitsubishi Chemical Corporation, Specialty Chemicals Company, Tokyo, Japan, including POLYTAIL™ H.

While not intending to be bound by theory, it is believed that the mechanism that results in adhesion of the coating to the substrate involves a migration of the olefin-based block copolymer to the olefinic or TPO substrate interface and an interaction with the olefinic or TPO substrate. It is believed that the migration and/or interaction is facilitated by application of heat, such as the heat applied to cure the coating composition. Olefin-based block copolymers having narrower polydispersity (i.e., closer to the ideal of 1), in which high molecular weight fractions are less than for materials having similar number average molecular weights but broader (higher) polydispersity, are believed to offer an advantage in either better adhesion at lower levels of incorporation or effective adhesion achieved under milder conditions (lower temperatures and/or shorter interaction times). "Polydispersity," also known simply as "dispersity," is defined in polymer science as the ratio of the weight average molecular weight to the number average molecular weight. Higher polydispersity numbers indicate a broader distribution of molecular weights, and in particular mean a larger fraction of higher molecular weight species. The olefin-based block copolymer of the invention thus preferably has a narrow polydispersity.

When the olefin polymer is anionically polymerized it may have a very narrow polydispersity, such as on the order of only about 1.1. The ring-opening reactions of lactones and alkylene oxides or reactions of other materials that add head-to-tail like the hydroxy carboxylic acids tend to produce polymers that are more uniform and have narrow polydispersities. Modification of the olefin polymer by a head-to-tail reaction such as a ring-opening reaction of a lactone or alkylene oxide compound usually results in a product having a polydispersity of about 1.1 or 1.15, thus essentially preserving the narrow polydispersity of the hydroxyl-functional olefin starting material. Block copolymers of the invention preferably have polydispersities of about 1.2 or less, and more preferably have polydispersities of about 1.15 or less.

Again while not wishing to be bound by theory, it is believed that the modification of the olefin polymer by the (poly)ester or (poly)ether block or blocks offers significant advantages in providing adhesion of coatings to olefinic substrates because of increased compatibility of the resulting block copolymer toward materials commonly employed in such coatings. In addition, the imposition of the (poly)ester or (poly)ether block between the olefin block and the functional group, such as the hydroxyl group, makes that functional group more accessible for reaction during the curing of the coating composition. These principles can be used to optimize the olefin-based block copolymer of the invention for use under particular conditions or with or in particular coating compositions.

In a preferred embodiment, the hydroxy-functional olefin polymer is reacted with a lactone or a hydroxy carboxylic acid to form an olefin-based polymer having (poly)ester end blocks. Lactones that can be ring opened by an active hydrogen are well-known in the art. Examples of suitable lactones include, without limitation, ε-caprolactone, γ-caprolactone, β-butyrolactone, β-propriolactone, γ-butyrolactone, α-methyl-γ-butyrolactone, β-methyl-γ-butyrolactone, γ-valerolactone, δ-valerolactone, γ-decanolactone, δ-decanolactone, γ-nonanoic lactone, γ-octanoic lactone, and combinations of these. In one preferred embodiment, the lactone is ε-caprolactone. Lactones useful in the practice of the invention can also be characterized by the formula:

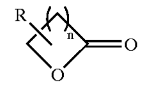

wherein n is a positive integer of 1 to 7 and R is one or more H atoms, or substituted or unsubstituted alkyl groups of 1–7 carbon atoms.

The lactone ring-opening reaction is typically conducted under elevated temperature (e.g., 80–150° C.). When the reactants are liquids a solvent is not necessary. However, a solvent may be useful in promoting good conditions for the reaction even when the reactants are liquid. Any non-reactive solvent may be used, including both polar and nonpolar organic solvents. Examples of useful solvents include, without limitation, toluene, xylene, methyl ethyl ketone, methyl isobutyl ketone, and the like and combinations of such solvents. A catalyst is preferably present. Useful catalysts include, without limitation, proton acids (e.g., octanoic acid, Amberlyst® 15 (Rohm & Haas)), and tin catalysts (e.g., stannous octoate). Alternatively, the reaction can be initiated by forming a sodium salt of the hydroxyl group on the molecules that will react with the lactone ring.

A hydroxy carboxylic acid can also be used instead of a lactone or in combination with a lactone as the compound that reacts with the hydroxyl-functional olefin polymer to provide ester blocks. Useful hydroxy carboxylic acids include, without limitation, dimethylhydroxypropionic acid, hydroxy stearic acid, tartaric acid, lactic acid, 2-hydroxyethyl benzoic acid, N-(2-hydroxyethyl)ethylene diamine triacetic acid, and combinations of these. The reaction can be conducted under typical esterification conditions, for example at temperatures from room temperature up to about 150° C., and with catalysts such as, for example, calcium octoate, metal hydroxides like potassium hydroxide, Group I or Group II metals such as sodium or lithium, metal carbonates such as potassium carbonate or magnesium carbonate (which may be enhanced by use in combination with crown ethers), organometallic oxides and esters such as dibutyl tin oxide, stannous octoate, and calcium octoate, metal alkoxides such as sodium methoxide and aluminum tripropoxide, protic acids like sulfuric acid, or $Ph_4SbI$. The reaction may also be conducted at room temperature with a polymer-supported catalyst such as Amerlyst-15® (available from Rohm & Haas) as described by R. Anand in *Synthetic Communications,* 24(19), 2743–47 (1994), the disclosure of which is incorporated herein by reference.

While polyester segments may likewise be produced with dihydroxy and dicarboxylic acid compounds, it is preferred to avoid such compounds because of the tendency of reactions involving these compounds to increase the polydispersity of the resulting block copolymer. If used, these compounds should be used in limited amounts and preferably employed only after the lactone or hydroxy carboxylic acid reactants have fully reacted.

The reaction with the lactone or hydroxy carboxylic acid or oxirane compounds adds at least one monomer unit as the B block and preferably provides chain extension of the olefin polymer. In particular, the (poly)ester and/or (poly) ether block is thought to affect the polarity and effective reactivity of the end group functionality during curing of the coating. The (poly)ester and/or (poly)ether block also makes the olefin-based block copolymer more compatible with components of a typical curable coating composition. The amount of the extension depends upon the moles of the alkylene oxide, lactone, and/or hydroxy carboxylic acid available for reaction. The relative amounts of the olefin polymer and the alkylene oxide, lactone, and/or hydroxy acid can be varied to control the degree of chain extension. The reaction of the lactone ring, oxirane ring, and/or hydroxy carboxylic acid with a hydroxyl group results in the formation of an ether or ester and a new resulting hydroxyl group that can then react with another available monomer, thus providing the desired chain extension. In the preferred embodiments of the present invention, the equivalents of oxirane, lactone, and/or hydroxy carboxylic acid for each equivalent of hydroxyl on the olefin polymer are from about 0.5 to about 25, more preferably from about 1 to about 10, and even more preferably from about 2 to about 6. In an especially preferred embodiment about 2.5 equivalents of lactone are reacted for each equivalent of hydroxyl on the olefin polymer.

In another embodiment of the invention, a polyolefin having terminal hydroxyl groups is reacted with an oxirane-containing compound to produce (poly)ether endblocks. The oxirane-containing compound is preferably an alkylene oxide or cyclic ether, especially preferably a compound selected from ethylene oxide, propylene oxide, butylene oxide, tetrahydrofuran, and combinations of these. Alkylene oxide polymer segments include, without limitation, the polymerization products of ethylene oxide, propylene oxide, 1,2-cyclohexene oxide, 1-butene oxide, 2-butene oxide, 1-hexene oxide, tert-butylethylene oxide, phenyl glycidyl ether, 1-decene oxide, isobutylene oxide, cyclopentene oxide, 1-pentene oxide, and combinations of these. The hydroxyl group of the olefin-based polymer functions as initiator for the base-catalyzed alkylene oxide polymerization. The polymerization may be carried out, for example, by charging the hydroxyl-terminated olefin polymer and a catalytic amount of caustic, such as potassium hydroxide, sodium methoxide, or potassium tert-butoxide, and adding the alkylene oxide at a sufficient rate to keep the monomer available for reaction. Two or more different alkylene oxide monomers may be randomly copolymerized by coincidental addition and polymerized in blocks by sequential addition.

Tetrahydrofuran polymerizes under known conditions to form repeating units $$-[CH_2CH_2CH_2CH_2O]-$$

Tetrahydrofuran is polymerized by a cationic ring-opening reaction using such counterions as $SbF_6^-$, $AsF_6^-$, $PF_6^-$, $SbCl_6^-$, $BF_4^-$, $CF_3SO_3^-$, $FSO_3^-$, and $ClO_4^-$. Initiation is by formation of a tertiary oxonium ion. The polytetrahydrofuran segment can be prepared as a "living polymer" and terminated by reaction with the hydroxyl group of the olefin polymer.

It is also highly desirable for the olefin-based block copolymer of the invention to have functional groups that are reactive with one or more film-forming components of the adhesion promoter, or of the coating composition applied over an adhesion promoter containing the olefin-based block copolymer, or of the coating composition to which the olefin-based block copolymer is added. The film-forming components with which the olefin-based block copolymer may be reactive may be a film-forming polymer or a curing agent. The reactive functional groups on the olefin-based block copolymer may include, without limitation, hydroxyl, carbamate, urea, carboxylic acid, and combinations of these. Following addition of the ether or ester blocks, the block copolymer of the invention has one or more hydroxyl groups, which may be reactive with the film-forming polymer or curing agent. If desired, the hydroxyl groups may be converted to other functional groups, including carbamate, urea, carboxylic acid groups and combinations of these. Carbamate groups according to the invention can be represented by the structure

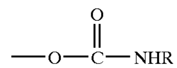

in which R is H or alkyl, preferably of 1 to 4 carbon atoms. Preferably R is H or methyl, and more preferably R is H. Urea groups according to the invention can be represented by the structure

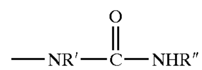

in which R' and R" are each independently H or alkyl, or R' and R" together form a heterocyclic ring structure. Preferably, R' and R" are each independently H or alkyl of from 1 to about 4 carbon atoms or together form an ethylene bridge, and more preferably R' and R" are each independently H. An hydroxyl group can be converted to a carbamate group by reaction with a monoisocyanate (e.g., methyl isocyanate) to form a secondary carbamate group (that is, a carbamate of the structure above in which R is alkyl) or with cyanic acid (which may be formed in situ by thermal decomposition of urea) to form a primary carbamate group (i.e., R in the above formula is H). This reaction preferably occurs in the presence of a catalyst as is known in the art. A hydroxyl group can also be reacted with phosgene and then ammonia to form a primary carbamate group, or by reaction of the hydroxyl with phosgene and then a primary amine to form a compound having secondary carbamate groups. Finally, carbamates can be prepared by a transesterification approach where hydroxyl group is reacted with an alkyl carbamate (e.g., methyl carbamate, ethyl carbamate, butyl carbamate) to form a primary carbamate group-containing compound. This reaction is performed at elevated temperatures, preferably in the presence of a catalyst such as an organometallic catalyst (e.g., dibutyltin dilaurate). A hydroxyl group can be conveniently converted to a carboxylic acid by reaction with the anhydride of a dicarboxylic acid. It is possible and may be desirable to derivatize the hydroxyl functional olefin-based block copolymer to have other functional groups other than those mentioned, depending upon the particular coating composition with which the olefin-based block copolymer is to interact. The hydroxyl groups of the low molecular weight polyolefin polyol may also be derivatized to hydroxyl, carbamate, urea, carboxylic acid or other functional groups. For convenience, the term "polyolefin polyol" as used in the description of this invention is used to encompass such derivatives having different functional groups. The functional groups, whether hydroxyl or the other functional groups, react during curing to crosslink to a cured film.

The olefin-based block copolymer of the invention can be combined with a chlorinated polyolefin to prepare an adhesion promoter for olefinic substrates like TPO to provide excellent adhesion of subsequent coating layers to the substrates. Some examples of chlorinated polyolefins can be found in U.S. Pat. Nos. 4,683,264; 5,102,944; and 5,319,032. Chlorinated polyolefins are known in the art and are commercially available form various companies, including Nippon Paper, Tokyo, Japan, under the designation Superchlon; Eastman Chemical Company, Kingsport, Tenn. under the designation CPO; and Toyo Kasei Kogyo Company, Ltd., Osaka, Japan under the designation Hardlen.

Chlorinated polyolefins typically have a chlorine content of at least about 10%, preferably at least about 15% by weight and up to about 40%, preferably up to about 30% by weight. Chlorinated polyolefins having a chlorine content of up to about 26% by weight are preferred. Even more preferred are chlorine contents of up to about 24% weight. It is also preferred for the chlorine content to be from about 18% to about 22% by weight. The chlorinated polyolefin in general may have number average molecular weight of from about 2000 to about 150,000, preferably from about 50,000 to about 90,000. Chlorinated polyolefins having number average molecular weights of from about 65,000 to about 80,000 are particularly preferred.

The chlorinated polyolefins may be based on grafted or ungrafted polyolefins such as, without limitation, chlorinated polypropylene, chlorinated polybutene, chlorinated polyethylene, and mixtures thereof. The non-grafted olefin polymer for chlorination can be homopolymers of alpha monoolefins with 2 to 8 carbon atoms, and the copolymers can be of ethylene and at least one ethylenically unsaturated monomer like alpha monoolefins having 3 to 10 carbon atoms, alkyl esters with 1 to 12 carbon atoms of unsaturated monocarboxylic acids with 3 to 20 carbon atoms, and unsaturated mono- or dicarboxylic acids with 3 to 20 carbon atoms, and vinyl esters of saturated carboxylic acids with 2 to 18 carbon atoms.

The graft copolymer based resins are reaction products of an alpha-olefin polymer and a grafting agent. The alpha-olefin homopolymer of one or copolymer of two alpha-olefin monomers with two to eight carbon atoms can include: a) homopolymers such as polyethylene and polypropylene, and b) copolymers like ethylene/propylene copolymers, ethylene/1-butene copolymers, ethylene/4-methyl-1-pentene copolymers, ethylene/1-hexene copolymers, ethylene/1-butene/1-octene copolymers, ethylene/1-decene copolymers, ethylene/4-ethyl-1-hexene copolymers, and ethylene/4-ethyl-1-octene copolymers. Chlorinated grafted polypropylene can be prepared by solution chlorination of a graft-modified polypropylene homopolymer or propylene/alpha-olefin copolymer. Such grafting polymerization is usually conducted in the presence of a free radical catalyst in a solvent which is inert to chlorination. Fluorobenzene, chlorofluorobenzene carbon tetrachloride, and chloroform and the like are useful solvents. Typically, such grafted polypropylenes are those base resins that have been grafted with an alpha, beta-unsaturated polycarboxylic acid or an acid anhydride of an alpha, beta-unsaturated anhydride to form an acid-and/or anhydride-modified chlorinated polyolefin. Suitable grafting agents generally include maleic acid or anhydride and fumaric acid and the like.

Modified chlorinated polyolefins can include those modified with an acid or anhydride group. Examples of unsaturated acids that can be used to prepare an modified, chlorinated polyolefin include, without limitation, acrylic acid, methacrylic acid, maleic acid, citraconic acid, fumaric acid, the anhydrides of these. The acid content of the chlorinated polyolefin is preferably from about 0.5% to about 6% by weight, more preferably from about 1% to about 3% by weight. Acid numbers of from about 50 to about 100 mg KOH/g may be preferred for the chlorinated polyolefin, particularly for waterborne compositions. Also, the chlorinated polyolefin polymer can be a chlorosulfonated olefin polymer or a blend of the chlorinated polyolefin polymer with the chlorosulfonated olefin polymer, where chlorosulfonation may be effected by reaction of the grafted or non-grafted base resin with a chlorosulfonating agent.

The adhesion promoter compositions of the invention have a weight ratio of the olefin-based block copolymer to the chlorinated polyolefin that can be from about 1:99 to about 99:1. The weight ratio of the olefin-based block copolymer to the chlorinated polyolefin is preferably from about 1:3 to about 3:1.

According to the method of the present invention, the adhesion promoter compositions are prepared by first forming the olefin based block copolymer reaction product solution as described herein above. The copolymer solution is then combined with chlorinated polyolefin in the form of liquid or solid chips or particles at a temperature of between about 85° C. and about 50° C. and mixed into or melted into the copolymer to form the adhesion promoter composition. This method demonstrated unexpected improvement over alternative methods of forming the adhesion promoter compositions wherein the chlorinated polyolefin is only added and stirred together with the olefin-based block copolymer between 40° C. and room temperature, in that the adhesion promoter is a stable dispersion. Additionally, coating compositions containing the adhesion promoter prepared according to the method of the instant invention demonstrate improved adhesion to a substrate in comparison to coatings utilizing a mixture of the olefin based block copolymer and chlorinated polyolefin mixed at between 40° C. and room temperature.

The coating composition may further include other components, including for example and without limitation crosslinking agents, catalysts suitable for reaction of the particular crosslinker, solvents including water and organic solvents, surfactants, stabilizers, matting agents, wetting agents, rheology control agents, dispersing agents, adhesion promoters, pigments, fillers, customary coatings additives, and combinations of these. Suitable crosslinking agents are reactive with the functionality on the olefin-based block copolymer and/or reactive with acid or anhydride groups of the chlorinated polyolefin and/or reactive with a component of a coating applied over the adhesion promoter composition of the invention. Suitable pigments and fillers include, without limitation, conductive pigments, including conductive carbon black pigments and conductive titanium dioxide pigments; non-conductive titanium dioxide and carbon pigments, graphite, magnesium silicate, ferric oxide, aluminum silicate, barium sulfate, aluminum phosphomolybdate, aluminum pigments, and color pigments. The pigments and, optionally, fillers are typically included at a pigment to binder ratio of from about 0.1 to about 0.6, preferably from about 0.1 to about 0.25.

In one embodiment, the coating comprises only a solution or dispersion that includes only or essentially only the olefin-based block copolymer and chlorinated polyolefin as the vehicle components. In this embodiment, it is preferred to first apply the coating directly to the plastic substrate and then to apply a layer of a coating composition that includes one or more components reactive with either the olefin-based block copolymer or the chlorinated polyolefin, modified with functional groups such as acid or anhydride, of the adhesion promoter layer. Applying coating layers "wet-on-wet" is well known in the art.

In a preferred embodiment, the coating composition further includes at least one crosslinking agent reactive with the olefin-based block copolymer and/or chlorinated polyolefin components. The curing agent has, on average, at least about two crosslinking functional groups. Suitable curing agents for active-hydrogen functional olefin-based block copolymers include, without limitation, materials having active methylol or methylalkoxy groups, such as aminoplast crosslinking agents or phenol/formaldehyde adducts, curing agents that have isocyanate groups, particularly blocked isocyanate curing agents; curing agents having epoxide groups; and combinations of these. Examples of preferred curing agent compounds include melamine formaldehyde resins (including monomeric or polymeric melamine resin and partially or fully alkylated melamine resin), blocked or unblocked polyisocyanates (e.g., toluene diisocyanate, MDI, isophorone diisocyanate, hexamethylene diisocyanate, and isocyanurate trimers of these, which may be blocked for example with alcohols or oximes), urea resins (e.g., methylol ureas such as urea formaldehyde resin, alkoxy ureas such as butylated urea formaldehyde resin), polyanhydrides (e.g., polysuccinic anhydride), polysiloxanes (e.g., trimethoxy siloxane), and combinations of these. Unblocked polyisocyanate curing agents are usually formulated in two-package (2K) compositions, in which the curing agent and the film-forming polymer (in this case, at least the block copolymer) are mixed only shortly before application and because the mixture has a relatively short pot life. The curing agent may be combinations of these, particularly combinations that include aminoplast crosslinking agents. Aminoplast resins such as melamine formaldehyde resins or urea formaldehyde resins are especially preferred. For this embodiment of the adhesion promoter, the applied adhesion promoter may be either coated "wet-on-wet" with one or more coating compositions, and then all layers cured together, or the adhesion promoter layer may be partially or fully cured before being coated with any additional coating layers. Curing the adhesion promoter layer before applying an additional coating layer may allow the subsequent coating layer to be applied electrostatically when the adhesion promoter is formulated with a conductive pigment such as conductive carbon black or conductive titanium dioxide, according to methods known in the art.

The coating may include any of a variety of organic solvents, as further described below. Aliphatic and aromatic hydrocarbon solvents are preferred.

Alternatively, the combination of the olefin-based block copolymer and the chlorinated polyolefin can be added to a variety of coating compositions to produce coating compositions that have excellent adhesion to plastic substrates, particularly to olefinic substrates, including TPO. Compositions in which the combination of the olefin-based block copolymer and the chlorinated polyolefin may be used include primers, one-layer topcoats, basecoats, and clearcoats. Primers are preferred because of the presence of the chlorinated polyolefin material. The coating composition having the added block copolymer and chlorinated polyolefin combination of the invention can then be applied directly to an uncoated and unmodified olefin-based substrate or other plastic to form a coating layer having excellent adhesion to the substrate.

The coating compositions of the invention preferably include at least about 0.001% by weight of the olefin-based block copolymer and at least about 0.001% by weight of the chlorinated polyolefin, based upon the total weight of nonvolatile vehicle. In one preferred embodiment, the olefin-based block copolymer is included in the coating composition in an amount of at least about 3%, more preferably at least about 5% by weight of the total weight of nonvolatile vehicle. In another preferred embodiment, the chlorinated polyolefin is included in the coating composition in an amount of at least about 3%, more preferably at least about 5% by weight of the total weight of nonvolatile vehicle. Each of the olefin-based block copolymer and the chlorinated polyolefin may be included in of the nonvolatile vehicle of the coating composition independently in amounts of preferably up to about 20% by weight, more preferably up to about 10% by weight of the total weight of nonvolatile vehicle. Vehicle is understood to be the resinous and polymer components of the coating composition, which includes film forming resins and polymers, crosslinkers, other reactive components such as the olefin-based block copolymer, the chlorinated polyolefin, and other reactive or nonreactive resinous or polymeric components such as acrylic microgels.

The coating compositions of the invention may contain a wide variety of film-forming resins. At least one crosslinkable resin is included. The resin may be self-crosslinking, but typically a coating composition includes one or more crosslinking agents reactive with the functional groups on the film-forming resin. Film-forming resins for coating compositions typically have such functional groups as, for example, without limitation, hydroxyl, carboxyl, carbamate, urea, epoxide (oxirane), primary or secondary amine, amido, thiol, silane, and so on and combinations of these. The film-forming resin may be any of those used in coating compositions including, without limitation, acrylic polymers, vinyl polymers, polyurethanes, polyesters (including alkyds), polyethers, epoxies, and combinations and graft copolymers of these. Also included are polymers in which one kind of polymer is used as a monomer in forming another, such as a polyester-polyurethane, acrylic-polyurethane, or a polyether-polyurethane in which a dihydroxy functional polyester, acrylic polymer, or polyether is used as a monomer in the urethane polymerization reaction. Preferred film-forming resins are acrylic polymers, and polyesters, including alkyds. Many references describe film-forming polymers for curable coating compositions and so these materials do not need to be described in further detail here.

Film-forming resins may be included in amounts of from about 5 to about 99%, preferably from about 20 to about 80% of the total solid vehicle of the coating composition. In the case of waterborne compositions, the film-forming resin is emulsified or dispersed in the water. In one embodiment, the coating composition includes both a polyurethane and an acrylic resin.

When the coating composition includes a curing agent, or crosslinker, the crosslinker is preferably reactive with both the olefin-based block copolymer and the polymeric film-forming resin, and optionally may be reactive with the chlorinated polyolefin if the latter is modified to have reactive groups such as acid groups. The curing agent has, on average, at least about two crosslinking functional groups, and is preferably one of the crosslinking materials already described above. Aminoplast resins such as melamine formaldehyde resins or urea formaldehyde resins are especially preferred for resin functional groups that are hydroxyl, carbamate, and/or urea. The coating compositions of the invention can be formulated as either one-component (one-package or 1K) or two-component (two-package or 2K) compositions, as is known in the art.

The adhesion promoter or coating composition used in the practice of the invention may include a catalyst to enhance the cure reaction. For example, when aminoplast compounds, especially monomeric melamines, are used as a curing agent, a strong acid catalyst may be utilized to enhance the cure reaction. Such catalysts are well-known in the art and include, without limitation, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. Other catalysts that may be useful in the composition of the invention include Lewis acids, zinc salts, and tin salts.

A solvent may optionally be included in the adhesion promoter or coating composition used in the practice of the present invention, and preferably at least one solvent is included. In general, the solvent can be any organic solvent and/or water. It is possible to use one or more of a broad variety of organic solvents. The organic solvent or solvents are selected according to the usual methods and with the usual considerations. In a preferred embodiment of the invention, the solvent is present in the coating composition in an amount of from about 0.01 weight percent to about 99 weight percent, preferably for organic solventborne compositions from about 5 weight percent to about 70 weight percent, and more preferably for topcoat compositions from about 10 weight percent to about 50 weight percent.

In another preferred embodiment, the solvent is water or a mixture of water with any of the typical co-solvents employed in aqueous dispersions. When the olefin-based block copolymer is to be used in a waterborne composition, it is advantageous to include in the block copolymer at least one polyethylene oxide segment or ionizable group to aid in dispersing the material. When modified with a polyethylene oxide segment or ionizable group, the block copolymer of the invention may be dispersed in water, optionally with other components (crosslinkers, additives, etc.) and then applied as an adhesion promoter or added to an aqueous coating composition as an aqueous dispersion of the block copolymer. Alternatively, the block copolymer may be blended with the film-forming polymer and then dispersed in water along with the film-forming polymer. In the latter method, it is contemplated that the block copolymer need not be modified with a hydrophilic segment, and instead the affinity of the block copolymer for the film-forming vehicle can be relied upon to maintain the components in a stable dispersion.

Additional agents known in the art, for example and without limitation, surfactants, fillers, pigments, stabilizers, wetting agents, rheology control agents (also known as flow control agents), dispersing agents, adhesion promoters, UV absorbers, hindered amine light stabilizers, silicone additives and other surface active agents, etc., and combinations of these may be incorporated into the adhesion promoter or coating composition containing the olefin-based block copolymer.

The adhesion promoter and coating compositions can be coated on an article by any of a number of techniques well-known in the art. These include, without limitation, spray coating, dip coating, roll coating, curtain coating, and the like. Spray coating is preferred for automotive vehicles or other large parts.

The inventive combination of the chlorinated polyolefin and the olefin-based block copolymer can be added to a topcoat coating composition in amounts that do not substantially change the gloss of the topcoat. In one application, for example, the olefin-based block copolymer is utilized in a topcoat composition, in particular a clearcoat composition which produces a high-gloss cured coating, preferably having a 20° gloss (ASTM D523-89) or a DOI (ASTM E430-91) of at least 80 that would be suitable for exterior automotive components.

In another application, the olefin-based block copolymer may be included in a topcoat or primer composition that produces a low gloss coating, such as for coating certain automotive trim pieces. Typical low gloss coatings have a gloss of less than about 30 at a 60° angle. the low gloss may be achieved by including one or more flatting agents. Low gloss primer compositions are often used to coat automotive trim pieces, such as in a gray or black coating. The low gloss primer is preferably a weatherable composition because the low gloss primer may be the only coating applied to such trim pieces. In the case of a weatherable primer, the resins are formulated to be light-fast and the composition may include the usual light stabilizer additives, such as hindered amine light stabilizers, UV absorbers, and antioxidants.

When the coating composition of the invention is used as a high-gloss pigmented paint coating, the pigment may include any organic or inorganic compounds or colored materials, fillers, metallic or other inorganic flake materials such as mica or aluminum flake, and other materials of kind that the art normally names as pigments. Pigments are usually used in the composition in an amount of 0.2% to 200%, based on the total solid weight of binder components (i.e., a pigment-to-binder ratio of 0.02 to 2). As previously mentioned, adhesion promoters preferably include at least one conductive pigment such as conductive carbon black pigment, conductive titanium dioxide, conductive graphite, conductive silica-based pigment, conductive mica-based pigment, conductive antimony pigment, aluminum pigment, or combinations of these, in an amount that makes the coating produced suitable for electrostatic applications of further coating layers.

The adhesion promoters and coating compositions can be applied at thicknesses that will produce dry film or cured film thicknesses typical of the art, such as from about 0.01 to about 5.0 mils. Typical thicknesses for adhesion promoter layers are from about 0.1 to about 0.5 mils, preferably from about 0.2 to about 0.3 mils. Typical thicknesses for primer layers are from about 0.5 to about 2.0 mils, preferably from about 0.7 to about 1.5 mils. Typical thicknesses for basecoat layers are from about 0.2 to about 2.0 mils, preferably from about 0.5 to about 1.5 mils. Typical thicknesses for clearcoat layers or one-layer topcoats are from about 0.5 to about 3.0 mils, preferably from about 1.5 to about 2.5 mils.

After application to the substrate, the adhesion promoters and coating compositions of the invention are heated to facilitate interaction with the substrate and thus to develop the adhesion of the applied composition to the substrate. Preferably, the coated substrate is heated to at least about the softening temperature of the plastic substrate. The adhesion promoters and coating compositions are preferably thermally cured. Curing temperatures will vary depending on the particular blocking groups used in the crosslinking agents, however they generally range between 160° F. and 270° F. The curing temperature profile must be controlled to prevent warping or deformation of the TPO substrate or other plastic substrate. The first compounds according to the present invention are preferably reactive even at relatively low cure temperatures. Thus, in a preferred embodiment, the cure temperature is preferably between 225° F. and 270° F., and more preferably at temperatures no higher than about 250° F. The curing time will vary depending on the particular components used, and physical parameters such as the thickness of the layers, however, typical curing times range from 15 to 60 minutes, and preferably 20–35 minutes. The most preferred curing conditions depends upon the specific coating composition and substrate, and can be discovered by straightforward testing.

The coating compositions of the invention are particularly suited to coating olefinic substrates, including, without limitation, TPO substrates, polyethylene substrates, and polypropylene substrates. The coating compositions may also be used, however, to coat other thermoplastic and thermoset substrates, including, without limitation, polycarbonate, polyurethane, and flexible substrates like EPDM rubber or thermoplastic elastomers. Such substrates can be formed by any of the processes known in the art, for example, without limitation, injection molding and reaction injection molding, compression molding, extrusion, and thermoforming techniques.

The materials and processes of the invention can be used to form a wide variety of coated articles, including, without limitation, appliance parts, exterior automotive parts and trim pieces, and interior automotive parts and trim pieces.

The invention is further described in the following examples. The examples are merely illustrative and do not in any way limit the scope of the invention as described and claimed. All parts are parts by weight unless otherwise noted.

Coating Compositions

Coating compositions were prepared having the following formulations

| Component | Invention | Comparison A (cold mix cpo) | Comparison B (no cpo) | Comparison C (no e-cap) |
|---|---|---|---|---|
| Acrylic[1] | 87.4% (62%) | 87.4% (62%) | 87.3% (62%) | 87.4% (62%) |
| Melamine | 5.2% (3.7%) | 5.2% (3.7%) | 5.2% (3.7%) | 5.2% (3.7%) |
| Adhesion Additive 1 | 7.5% (5.3%) | — | — | — |
| Adhesion Additive 2 | — | 5.0% (3.5%) | 7.5% (5.3%) | — |
| Adhesion Additive 3 | — | — | — | 5.0% (3.5%) |
| Adhesion Additive 4[2] | — | 2.5% (1.8%) | — | 2.5% (1.8%) |
| Pigment | (29.1%) | (29.1%) | (29.1%) | (29.1%) |

[1]Acrylic resin 70% nonvolatile in aromatic solvents, hydroxyl number of 97 mg KOH/gram
[2]Chlorinated polyolefin sold under the trademark Superclon 892 (20% nonvolatile in a mixture of toluene, cyclohexane and isopropanol, available from Nippon Paper, Tokyo, Japan) Example 1.

Coating Compositions were prepared having the formulations set forth in Table 1, as described according to the examples set forth below. All percentages first presented are weight %, based on total fixed vehicle weight. Percentages indicated as (%) are based on total solids weight.

EXAMPLE 1

Additive 1 Synthesis (% by weight based on total weight of fixed vehicle)

| | |
|---|---|
| Hydrogenated polyolefin polyol[1] | 46% |
| ε-caprolactone | 20% |
| chlorinated polyolefin[2] | 33% |
| HCl scavenger | 1% |

To a 3-liter flask, equipped with stirrer, condenser and nitrogen blanket, were added 500.91 grams hydrogenated polyolefin polyol, 214.7 grams ε-caprolactone and 1329.00 grams of Aromatic 100 and stirred until a temperature of 115° C. was reached. 1.26 grams stannous octoate and an additional 11 grams of Aromatic 100 solvent were added and the temperature was increased to 145° C. and held for 2 hours until a non-volatile content of 35% was reached. The reaction was then cooled to 60° C. and an additional 2673.00 grams of Aromatic 100 solvent and 357.49 grams chlorinated polyolefin was added. The mixture was stirred to melt the chlorinated polyolefin and then cooled under agitation for approximately one hour.

Coating Composition-1

A primer coating composition was prepared by combining a millbase of an acrylic polymer, pigment and solvent. After milling, the millbase was combined with Adhesion Additive 1.

COMPARATIVE EXAMPLE A

Additive 2-Synthesis (% by weight based on total weight of fixed vehicle)

To a 3-liter flask, equipped with stirrer, condenser and nitrogen blanket, were added

| | |
|---|---|
| Hydrogenated polyolefin polyol[1] | 787.0 grams |
| ε-caprolactone | 137.7 grams |
| xylene | 380.8 grams |
| stannous octoate | 3.2 grams |

The mixture was heated to and maintained at 145 degrees C. for 2.5 hours. After cooling under agitation, the polymer was further reduced with 291.3 grams of xylene.

Comparative Coating A

A primer coating composition was prepared by combining, at ambient temperature, a millbase of Adhesion Additive 2, acrylic polymer, pigment, Adhesion Additive 4 and solvent. After milling the mixture is reduced with solvent.

COMPARATIVE EXAMPLE B

Additive 3 Synthesis (% by weight based on total weight of fixed vehicle)

| | |
|---|---|
| Aromatic 100 Solvent | 80% |
| Hydrogenated polyoletin polyol[1] | 20% |

The solvent and polyol are added to a reactor and heated to 60° C. The solution is then cooled under vigorous agitation to obtain a solution with a particle size of less than 20 microns.

Comparative Coating B

A primer coating composition was prepared by combining, at ambient temperature, Adhesion Additive 2, acrylic polymer, solvent and pigment. After milling, the mixture is reduced with solvent.

COMPARATIVE EXAMPLE C

Comparative Coating C

A primer coating composition was prepared by combining, at ambient temperature, a millbase of acrylic polymer, pigment, Adhesion Additive 3, Adhesion Additive 4, and solvent. After milling, the mixture is reduced with solvent.

Testing

Coatings were applied to a TPO substrate and tested under the conditions set forth below.

Condensation Test

The coating compositions of Example 1 and Comparative Examples A, B and C were tested on material conditioned in a controlled atmosphere of 23+/−2° C. and 50+/−5% relative humidity for not less than 24 hours prior to testing and tested under the following conditions. Panels were placed on a frame provided to act as a roof of a condensing cabinet at an incline of 60°. Air temperature within the cabinet was maintained at 60° C. Air temperature at the panel back was 23+/−2 degrees C. The panels were exposed to 72 hours of wet condensate. Following exposure panels were dried and examined for dulling, blistering and loss of adhesion.

TABLE 2

Condensation Test Results

| Example | Condensation Testing (% adhesion loss) Panel 1 | Condensation Testing (% adhesion loss) Panel 2 | Condensation Testing (Blistering) Panel 1 | Condensation Testing (Blistering) Panel 2 |
|---|---|---|---|---|
| Example 1 | 0% | 3% | None | None |
| Comparative A | 80% | 25% | Blistering | Slight Blistering |
| Comparative B | 0% | 25% | Blistering | Blistering |
| Comparative C | 100% | 100% | Delaminated | Delaminated |

The results demonstrate that the addition of the chlorinated polyolefin to the e-caprolactone extended hydrogenated polyolefin polyol at elevated temperature improves the adhesion of the final coating composition.

TABLE 3

Stability Results of Adhesion Additives

| Example | Stability- (Based on qualitative observation) |
|---|---|
| Additive 1 | No settling after 90 days at room temperature |
| Additive 2 | Falls out of solution and reagglomerates to particles of 100 microns and above -overnight |
| Additive 3 | Falls out of solution and reagglomerates to particles of 100 microns and above-overnight |
| Additive 4 | Settles overnight |

The invention has been described in detail with reference to preferred embodiments thereof. It should be understood, however, that variations and modifications can be made within the spirit and scope of the invention and of the following claims.

What is claimed is:

1. An adhesion promoter composition formed by a process comprising (a) forming an olefin-based block copolymer by reacting a hydroxyl-functional, substantially saturated olefin polymer with a chain-extension reagent selected from the group consisting of lactones, hydroxy carboxylic acids, alkylene oxides, and combinations thereof, said chain-extension reagent forming the modifying block of the block copolymer; and (b) providing the olefin based block copolymer mixture at a temperature between 85° and 50° C. and adding to the block copolymer, a chlorinated polyolefin, with agitation, wherein the adhesion promoter demonstrates improved stability over an adhesion promoter of an identical formulation formed at temperatures between room temperature and 40° C.

2. A coating composition comprising a mixture of (a) 3 to 100% by weight of an adhesion promoter formed by a process comprising (i) forming an olefin-based block copolymer by reacting a hydroxyl-functional, substantially saturated olefin polymer with a chain-extension reagent selected from the group consisting of lactones, hydroxy carboxylic acids, alkylene oxides, and combinations thereof, said chain-extension reagent forming the modifying block of the block copolymer; and (ii) providing the olefin based block copolymer mixture at a temperature between 85° and 50° C. and adding to the block copolymer, a chlorinated polyolefin, with agitation; and (b) 0 to 97% by weight of resin solids of a resinous film-forming polymer selected from liquid, organic solvent reducible, and water-reducible film forming polymers; and (c) solvent.

3. A coating composition according to claim 2, wherein said block copolymer has at least one functional group selected from hydroxyl groups, carbamate groups, urea groups, carboxylic acid groups, and combinations thereof.

4. A coating composition according to claim 2, wherein said olefin block is substantially linear.

5. A coating composition according to claim 2, wherein the olefin-based block copolymer has a structure $$A\text{-}[O\text{-}(B)]_m,$$

in which A represents an olefin block, B represents a (poly)ester or (poly)ether block or combinations thereof, and m is on average from about 0.7 to about 10.

6. A coating composition according to claim 5, wherein m is on average about 1.8 to about 2.

7. A coating composition according to claim 5, wherein said block copolymer has a hydroxyl equivalent weight of from about 1000 to about 3000.

8. A coating composition according to claim 2, wherein said block copolymer has a polydispersity of about 1.2 or less.

9. A coating composition according to claim 2, wherein said modifying block has on average from about 0.5 to about 25 monomer units.

10. A coating composition according to claim 2, wherein said modifying block has on average from about 2 to about 10 monomer units.

11. A coating composition according to claim 2, wherein said chain-extension reagent comprises epsilon-caprolactone.

12. A coating composition according to claim 2, further comprising at least one conductive pigment selected from the group consisting of conductive carbon black pigment, conductive titanium dioxide pigment, conductive graphite, conductive silica-based pigment, conductive mica-based pigment, conductive antimony pigment, aluminum pigment, and combinations thereof.

13. A coating composition according to claim 2, further comprising at least one film-forming polymer different from the chlorinated polyolefin and the olefin-based block copolymer.

14. A coating composition according to claim 2, wherein said block copolymer and said chlorinated polyolefin are each independently from about 1% to about 20% by weight of the total weight of nonvolatile vehicle of the coating composition.

15. A coating composition according to claim 2, wherein said block copolymer and said chlorinated polyolefin are each independently from about 3% to about 10% by weight of the total weight of nonvolatile vehicle of the coating composition.

16. A coating composition according to claim 2, wherein said at least one film-forming polymer is selected from the group consisting of polyurethanes, acrylic polymers, and combinations thereof and is present in an amount between 1% and 97% by weight based on total coating composition weight.

17. A coating composition according to claim 2, wherein said at least one film-forming polymer comprises an acrylic polymer, and further wherein each of said acrylic polymer and said block copolymer has at least one functional group selected from hydroxyl groups, carbamate groups, urea groups, and combinations thereof.

18. A coating composition according to claim 2, wherein said coating composition is a primer coating composition.

19. A coating composition according to claim 2, wherein said coating composition is a solventborne coating composition.

20. A coating composition according to claim 2, wherein said coating demonstrates improved adhesion over a comparative coating having an identical formulation, where the adhesion promoter of the comparative coating is prepared by combining the olefin based block copolymer with chlorinated polyolefin at temperatures between room temperature and 40° C.

21. A method of forming a coating composition comprising (a) forming an olefin-based block copolymer by reacting a hydroxyl-functional, substantially saturated olefin polymer with a chain-extension reagent selected from the group consisting of lactones, hydroxy carboxylic acids, alkylene oxides, and combinations thereof, said chain-extension reagent forming the modifying block of the block copolymer; and (b) forming an adhesion promoter by providing the olefin based block copolymer mixture at a temperature between 85° and 50° C. and adding, with agitation, to the copolymer a chlorinated polyolefin; and (c) adding to the adhesion promoter formed in (b), between 0 to 97% by weight of resin solids of a resinous film-forming polymer selected from liquid, organic solvent reducible, and water-reducible film forming polymers.

22. A method according to claim 21, wherein said block copolymer formed in step (a) has at least one functional group selected from hydroxyl groups, carbamate groups, urea groups, carboxylic acid groups, and combinations thereof.

23. A method according to claim 21, wherein the olefin-based block copolymer formed in step (a) has a structure $A\text{-}[O\text{-}(B)]_m$, wherein A respresents an olefin block, B represents a (poly)ester or (poly)ester black, or combinations thereof, and m is on average about 1.8 to about 2.

24. A method according to claim 23, wherein said block copolymer formed in (a) has a polydispersity of about 1.2 or less and a hydroxyl equivalent weight of from about 1000 to about 3000.

25. A method according to claim 23, wherein said modifying block formed in step (a) has on average from about 0.5 to about 25 monomer units.

26. A method according to claim 23 wherein said modifying block formed in step (a) comprises utilizing epsilon-caprolactone as a chain-extension agent.

* * * * *